United States Patent
Tijssen

(10) Patent No.: US 9,708,810 B2
(45) Date of Patent: *Jul. 18, 2017

(54) WATER VAPOUR CONTROL, WHICH IS ARRANGED FACING THE INSIDE OF A BUILDING

(75) Inventor: Pascal Maria Hubert Pierre Tijssen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,113

(22) PCT Filed: Jul. 3, 2012

(86) PCT No.: PCT/EP2012/062890
§ 371 (c)(1),
(2), (4) Date: May 2, 2014

(87) PCT Pub. No.: WO2013/017356
PCT Pub. Date: Feb. 7, 2013

(65) Prior Publication Data
US 2015/0121798 A1    May 7, 2015

(30) Foreign Application Priority Data

Aug. 2, 2011    (EP) .................................... 11176300

(51) Int. Cl.
*E04B 1/64* (2006.01)
*B32B 27/32* (2006.01)
(Continued)

(52) U.S. Cl.
CPC .............. *E04B 1/625* (2013.01); *B32B 27/08* (2013.01); *B32B 27/34* (2013.01); *B32B 27/36* (2013.01);
(Continued)

(58) Field of Classification Search
CPC . B32B 27/32; B32B 27/34; E04B 1/64; E04B 1/66; E04B 1/665; E04B 1/6806
(Continued)

(56) References Cited

U.S. PATENT DOCUMENTS 4,630,421 A    12/1986 Diehl et al.
6,258,890 B1 *  7/2001 Schmidt-Thuemmes  C08F 212/06
                                                                428/508
(Continued)

FOREIGN PATENT DOCUMENTS

CA    2215502    9/1997
CA    2581711    3/2006
(Continued)

OTHER PUBLICATIONS

International Search Report for PCT/EP2012/062890, mailed Jul. 31, 2012.
U.S. Appl. No. 14/235,871, filed Jul. 3, 2012.

*Primary Examiner* — Phi A
(74) *Attorney, Agent, or Firm* — Nixon & Vanderhye P.C.

(57) ABSTRACT

Water vapor control, which is arranged facing the inside of a building, comprising a first layer having a water vapor diffusion resistance (sd-value) of 1-5 meters diffusion-equivalent air space width, measured at a relative humidity of an atmosphere surrounding the layer of 30-50%, and having a sd-value of <1 meters diffusion-equivalent air space width, measured at a relative humidity of 60-80%, and a second layer having a sd-value of >0.6 meters diffusion-equivalent air space width, measured at a relative humidity of 80-100%, and wherein the second layer is located at the side of the vapor barrier facing the inside of the building, relative to the position of the first layer.

11 Claims, 3 Drawing Sheets

(51) Int. Cl.
  *E04B 1/62* (2006.01)
  *E04D 12/00* (2006.01)
  *E04B 1/66* (2006.01)
  *B32B 27/34* (2006.01)
  *B32B 27/36* (2006.01)
  *B32B 27/08* (2006.01)

(52) U.S. Cl.
  CPC ............ *E04B 1/665* (2013.01); *E04D 12/002* (2013.01); *B32B 2250/02* (2013.01); *B32B 2307/7265* (2013.01); *B32B 2367/00* (2013.01); *B32B 2377/00* (2013.01); *B32B 2419/00* (2013.01)

(58) Field of Classification Search
  USPC ............... 52/407.4, 404.1, 407.5, 407.2, 408
  See application file for complete search history.

(56) References Cited

U.S. PATENT DOCUMENTS

| | | | |
|---|---|---|---|
| 6,279,284 B1* | 8/2001 | Moras | 52/408 |
| 6,808,772 B2* | 10/2004 | Kunzel et al. | 428/35.4 |
| 6,986,229 B2* | 1/2006 | Collison et al. | 52/384 |
| 2004/0103603 A1 | 6/2004 | Kunzel et al. | |
| 2004/0103604 A1* | 6/2004 | Kunzel et al. | 52/404.1 |
| 2005/0000183 A1* | 1/2005 | Fay et al. | 52/506.01 |
| 2005/0014431 A1* | 1/2005 | Carmody et al. | 442/76 |
| 2005/0229518 A1* | 10/2005 | Ruid | B32B 17/02 52/404.1 |
| 2005/0255308 A1* | 11/2005 | Gregg et al. | 428/312.4 |
| 2006/0005492 A1* | 1/2006 | Yohnke | E04B 1/762 52/405.2 |
| 2006/0040091 A1 | 2/2006 | Bletsos et al. | |
| 2007/0283652 A1* | 12/2007 | Chen | B32B 27/06 52/408 |
| 2014/0013687 A1* | 1/2014 | Paul et al. | 52/302.1 |
| 2014/0377519 A1 | 12/2014 | Rancich et al. | 728/212 |
| 2015/0052847 A1 | 2/2015 | Wiercinski et al. | 52/741.4 |

FOREIGN PATENT DOCUMENTS

| | | |
|---|---|---|
| EP | 1296002 | 3/2003 |
| JP | 11-504088 | 6/1999 |
| JP | 2008-510640 | 10/2008 |
| WO | 96/33321 | 10/1996 |
| WO | 2006/024013 | 2/2006 |

* cited by examiner

WATER VAPOUR CONTROL, WHICH IS ARRANGED FACING THE INSIDE OF A BUILDING

This application is the U.S. national phase of International Application No. PCT/EP2012/062890 filed 3 Jul. 2012 which designated the U.S. and claims priority to EP Patent Application No. 11176300.9 filed 2 Aug. 2011, the entire contents of each of which are hereby incorporated by reference.

FIELD

The invention relates to a water vapour control, which is arranged facing the inside of a building.

BACKGROUND AND SUMMARY

In order to reduce the carbon dioxide emission and use of mineral oil and gas for the heating of buildings, thermal insulation is applied during the construction of new buildings and in the renovation of old buildings. Thermal insulation layers are in general placed internally, for example in a wooden roof construction. To avoid draft and also to protect the insulation material and the wooden construction against moisture normally at both sides of the insulation layer vapour controls may be placed, often in the form of membranes. Nevertheless moisture may penetrate into the roof construction, for example because of leakages through joints of the vapour control.

The vapour control placed at the outside of the roof construction may be in the form of a so-called roofing membrane or underlay. This vapour control ensures that no water in the form of rain, fog or snow penetrates the roof construction. This vapour control is highly permeable for water vapour to ensure that under all circumstances water that accumulates in the roof construction can evaporate from the roof construction.

It is important that the vapour control, which is arranged facing the inside of the building in winter time allows no or only a limited quantity of moisture to diffuse from the inside of the building into the insulation layers, where the moisture tends to condensate at the cold side of the insulation layers. During the summer however it is favourable if the vapour control, which is arranged facing the inside of the building is more permeable for water vapour to allow the insulation layers and the construction to dry from moisture by releasing the moisture also to the inside of the building.

For that reason in US-2004/0103604 a vapour control arranged at the inside of a building is proposed, which vapour control comprises a first layer having a water vapour diffusion resistance (Sd-value) of 2-5 meters diffusion-equivalent air space width, measured at a relative humidity of an atmosphere surrounding the layer of 30-50%, and having a Sd-value of <1 meters diffusion-equivalent air space width, measured at a relative humidity of 60-80%. In this way the vapour control has a high permeability for water vapour in summer, when ambient humidity is high and it has a low permeability for water vapour in winter time, when ambient humidity is normally low. A good example of a vapour control that fulfils these conditions is simply a polyamide film, since the diffusion constant of polyamide for water increases under humid conditions, due to the high water uptake of polyamide.

A problem however may occur where for example a kitchen or a bath room is present facing the vapour control. Because of the relatively high ambient humidity in such a room yet a high water transport takes place through the vapour control from the inside of the building, also in winter. This is of course especially true if the ventilation is poor and the use of the kitchen or bathroom is intensive. The water easily condenses in the isolation material and the roof construction and because of this fungi and rot may develop, causing bad smell and also damage of the roof construction.

Objective of the invention is to provide a vapour control that does not show this problem any more, while keeping enough capability to transport moisture to dry the insulation layers and the construction.

Surprisingly this objective is obtained by a vapour control arranged at the inside of a building is proposed, which vapour control comprises a first layer having a water vapour diffusion resistance (Sd-value) of 1-5 meters, preferably 2-5 meters diffusion-equivalent air space width, measured at a relative humidity of an atmosphere surrounding the layer of 30-50%, and having a Sd-value of <1 meters diffusion-equivalent air space width, measured at a relative humidity of 60-80%, comprising a second layer having a Sd-value of >0.2 meters diffusion-equivalent air space width, measured at a relative humidity of 80-100%, and the second layer is located at the side of the vapour barrier facing the inside of the building, relative to the position of the first layer.

DETAILED DESCRIPTION

Figure 1:
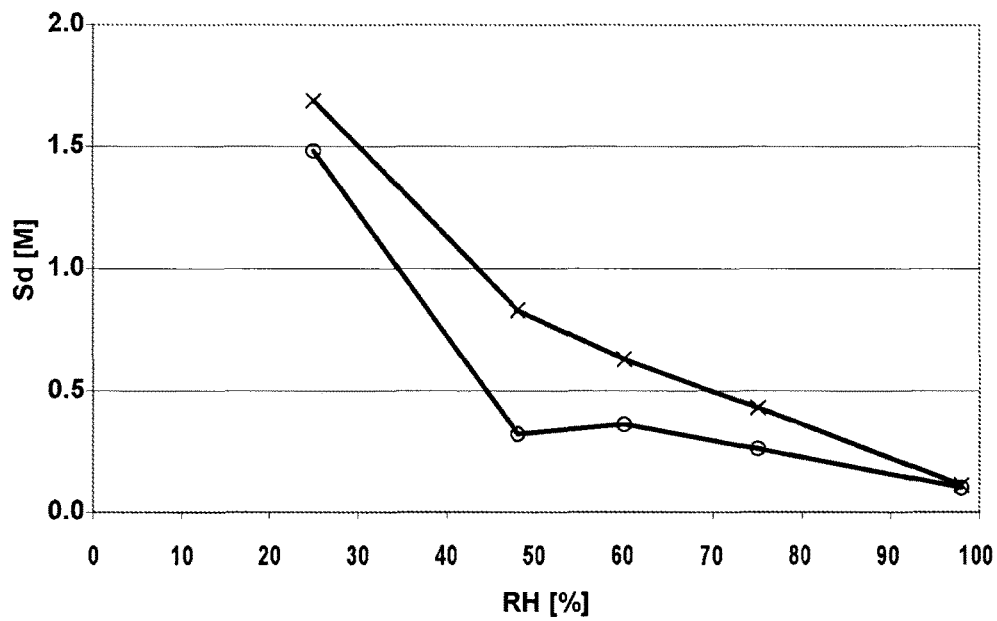
FIGS. 1-4 are graphical plots of the water vapour diffusion resistance (Sd) versus relative humidity (%) for the vapour controls of Examples 1-4, respectively.

According to the embodiments disclosed herein, the transport of water is especially prohibited from the inside of the building at places in the building where high relative humidity may be present, such as for example a bath room or a kitchen. Furthermore the water transport form the insulation layers into the building is kept at a high level under humid conditions in the insulation layers, while at the same time the transport of water from the inside of the building into the insulation layers is kept at a low level, under humid conditions at the inside of the building. In this way the resistance to water vapour diffusion is dependant from the direction it takes place and water is easily released from the insulation layers into the building if necessary, while at the same time the penetration of water from the inside of the building into the dried out insulation layers is prevented.

Preferably the Sd-value of the second layer is >0.4, more preferably >0.6, more preferably >0.8, more preferably >1.0 meters diffusion-equivalent air space width, measured at a relative humidity of 80-100%. Even more preferably the Sd-value of the second layer is >1.2 meters diffusion-equivalent air space width, measured at a relative humidity of 60-100%. Good results are obtained if the Sd-value of the second layer is <3, preferably <2 meters diffusion-equivalent air space width, measured at a relative humidity of 80-100%. This is because than still a sufficient transport may take place under humid conditions from the insulation layers into the building, while at places where a high relative humidity may be present in the building no problems occur with too much transport of water in the opposite direction. The Sd value of a layer is measured at a single layer film of the same thickness and the same composition as a layer of the vapour barrier control according to DIN EN ISO 12772: 2001, at 23° C.

The Sd-value of a layer may be changed by the choice of material for the layer and the layer thickness. The Sd-value of the total vapour barrier is the result of the total construction of the vapour barrier.

It is possible to use for the first layer a material that has no adequate strength itself, but which can be applied to suitable carrier, for example as a coating. Examples of such materials include modified polyvinyl alcohol, dispersions of hydrophobic synthetic resins, as well as methyl cellulose, linseed oil, alkyd resin, bone glue and protein derivatives. As carrier fiber spun fabrics, perforated polymer films, chip wood, paper etc. may be used.

As material for the first layer preferably polyamide is used, because a strong, self supporting layer may be produced, without the need of an extra carrier. Good examples of suitable polyamides include polyamide 6, polyamide 66, polyamide 46, polyamide 410 etc. Preferably polyamide 6 is used, because a very strong layer may be produced from the material and it is available in high quantities.

Preferably the material for the second layer has a water vapour diffusion rate which is less dependant on the surrounding relative humidity than the material of the first layer. More preferably the vapour diffusion rate of the material of the second layer is independent or at least essentially independent from the surrounding relative humidity.

Good examples of materials that may be used for the second layer include polyolefins, copolymers of olefins and vinyl esters, vinyl ethers, acrylates and methacrylates, polyesters, for example polyethylene terephthalate and polybutylene terephthalate, copolyester, for example thermoplastic elastomers comprising hard segments of polyester, especially the copolyetheresters, polyurethanes, polyacrylates, polymethacrylates, polyvinylacetates and copolymers comprising vinylacetate monomers. Suitably the layers of polymer are extruded films. Such films are monolithic films, which means that the films do not comprise any perforations or the like other than possible extrusion defects, like for instance pin holes. In this way a good working vapour barrier is obtained, with well-defined Sd values.

Preferably the vapour control is a multi-layer film, comprising the first and the second layer as a film layer, eventually with an adhesive layer between the first and the second layer.

A suitable adhesive layer may be used between the first and the second layer, for example a maleic anhydride grafted polyolefin, for example Yparex™ and Nucrel™ when polyolefins or copolymers of olefins and a further monomer or a polyurethane when a polyester or a copolyester is used.

More preferably the vapour control contains or is a multi-layer film comprising a polyamide layer as the first layer and a layer of a polyester or copolyester as the second layer, even more preferably with an adhesive layer in between. Good results are obtained if the vapour control contains a layer of a fleece, for example a polypropylene or a polyester fleece. Such a fleece provides extra strength to the vapour control and it improves the handling of the vapour control.

EXAMPLES

The invention will further be explained by the examples. Materials used:
Akulon™ F130, a polyamide 6, delivered by DSM, the Netherlands.

Arnitel™ PM460, a copolyesterether, delivered by DSM, the Netherlands.

Arnitel™ EM740, a copolyesterether, delivered by DSM, the Netherlands.

Arnitel™ CM551, a copolesthercarbonate, delivered by DSM, the Netherlands.

Arnitel™ 3106, a copolyesterether delivered by DSM, the Netherlands.

Arnitel™ Eco M700, a copolyester thermoplastic elastomer, containing hard segments of polyester and units of dimer fatty acid residues, delivered by DSM, the Netherlands.

Amite™ T06 200, a polybuhylene terephthalate, delivered by DSM, the Netherlands.

Preparation Vapour Control.

Vapour controls comprising one layer of polyamide 6 (comparative experiment) or one layer of polyamide 6 and one or more layers of copolyester (examples) were prepared using a Collin™ multilayer cast film extrusion line.

Measuring the Water Vapour Diffusion Resistance of the Vapour Controls.

The water vapour diffusion resistance (Sd) of the vapour controls was measured according to DIN EN ISO 12572: 2001. The films were placed on top of a cup, as therein indicated. Tests were performed at 23° C. and at a relative humidity [RH] inside/outside the cup of 0/50% (average 25%), 0/95% (average 47.5%), 100/20% (average 60%), 100/50% (average 75%) and 100/95% (average 97.5%). The average of the two values is taken as the value for the relative humidity. For each vapour control two series of measurements were performed, wherein the films were placed with the first layer or with the second layer directed inside the cup. This means that for every value of the relative humidity the first layer was once exposed to the highest value and once to the lowest value of the relative humidity. The highest and the lowest value for the RH may be located inside or outside the cup, as indicated above. The results are presented in FIGS. 1-5. x-x indicates that the polyamide layer is at the side with the lowest RH. o-o indicates that the polyamide layer is at the side with the highest RH.

EXAMPLE 1

The vapour control consists of
a first layer of Akulon™ F130, having a thickness of 25 microns and
a second layer of a blend of Arnitel PM460 and Arnitel CM551 in a ratio of 1:1, having a thickness of 15 microns.

The Sd-values of the vapour control are given in FIG. 1.

EXAMPLE 2

The vapour control consists of
a first layer of Akulon™ F130, having a thickness of 15 microns and
a second layer of Arnitel 3106, having a thickness of 15 microns.
In between the first and the second layer a tie layer is present, consisting of a blend of Arnitel PM460 and Arnitel CM551 in a ratio of 1:1, having a thickness of 15 microns.

Figure 2:
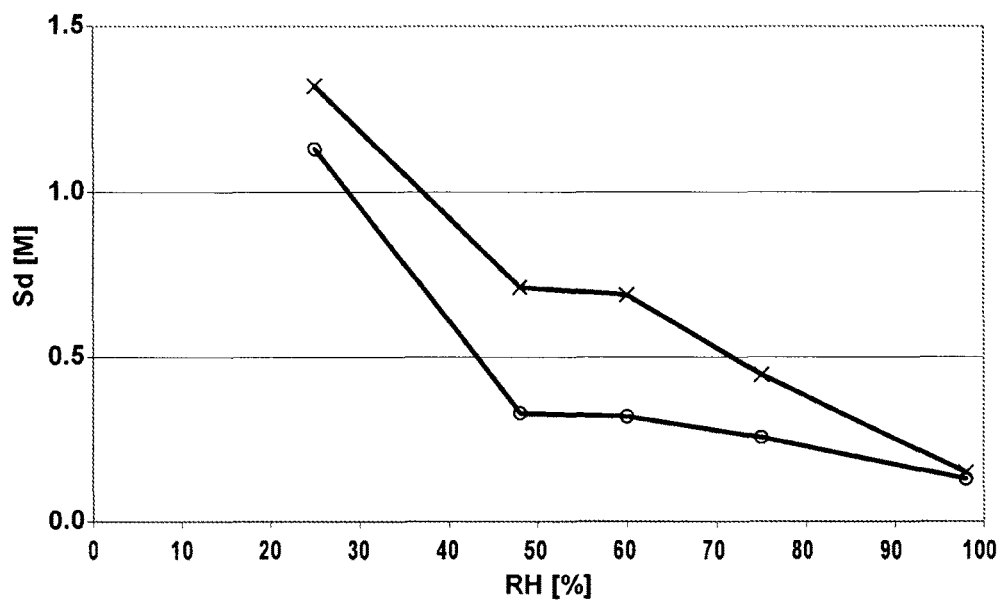
Figure 3:
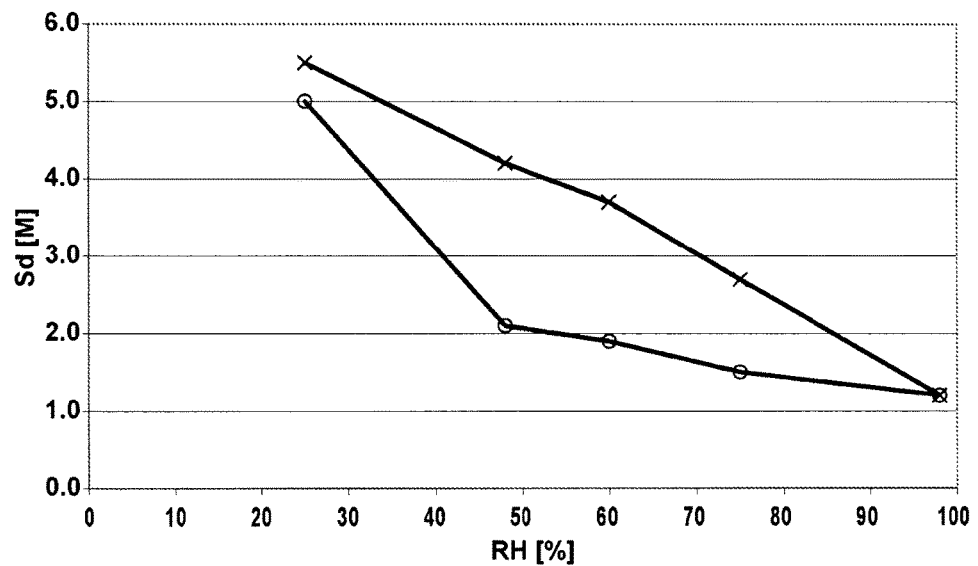
Figure 4:
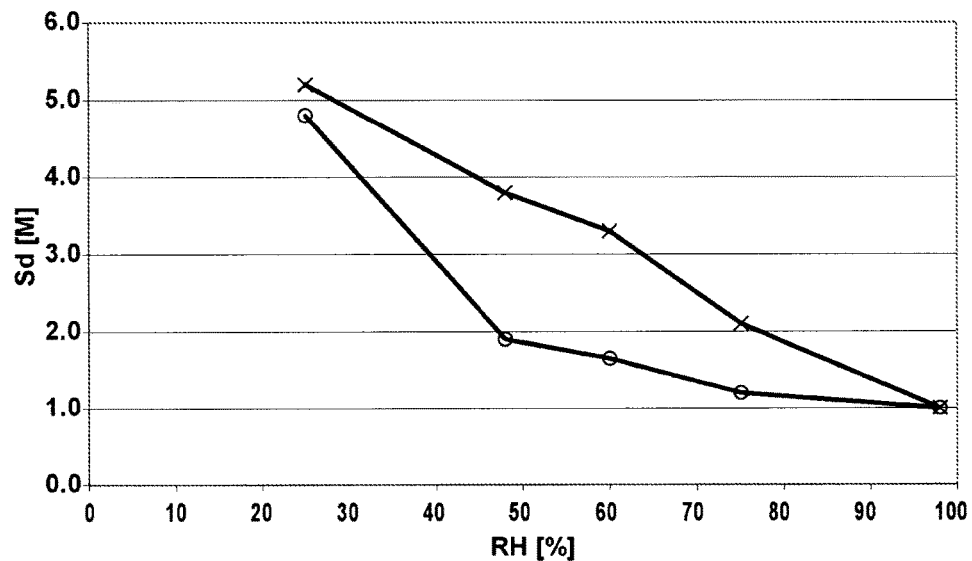

The Sd-values of the vapour control are given in FIG. 2.

EXAMPLE 3

The vapour control consists of
a first layer of Akulon™ F130, having a thickness of 50 microns and
a second layer of Arnitel Eco M700, having a thickness of 20 microns.
In between the first and the second layer a tie layer is present, consisting Arnitel CM551, having a thickness of 5 microns.
The Sd-values of the vapour control are given in FIG. 3.

EXAMPLE 4

The vapour control consists of
a first layer of Akulon™ F130, having a thickness of 50 microns and
a second layer of a blend of Arnite T06 200 and Arnitel CM551 in a ratio of 2:1, having a thickness of 25 microns.
The Sd-values of the vapour control are given in FIG. 4.

COMPARATIVE EXPERIMENT A

The vapour control consists of one single layer of Akulon™ F130, having a thickness of 50 microns. The Sd-values at the different relative humidity is given FIG. 5.

COMPARATIVE EXPERIMENT B

Figure 6:
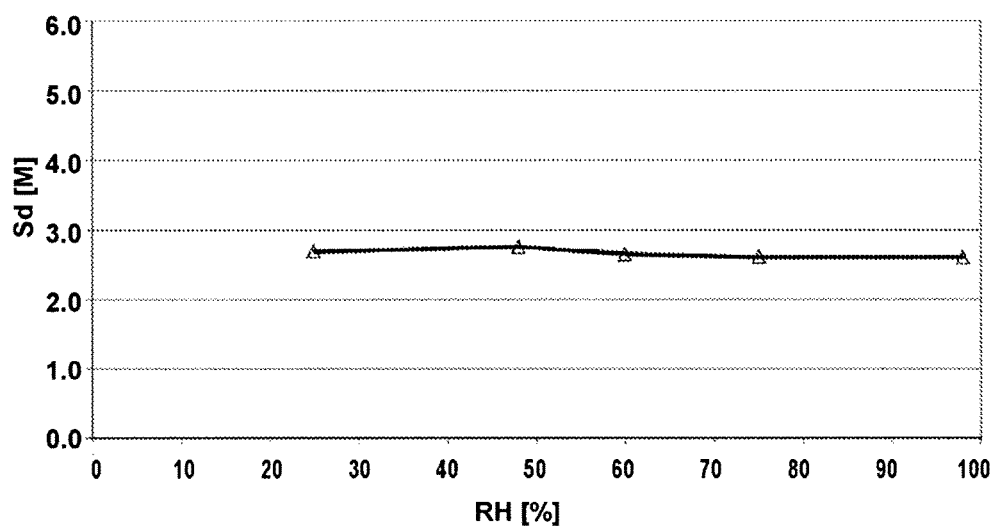

The vapour control consists of a single layer of Arnitel EM 740, having a thickness of 50 microns. The Sd values at different relative humidity is given in FIG. 6.

Figure 5:
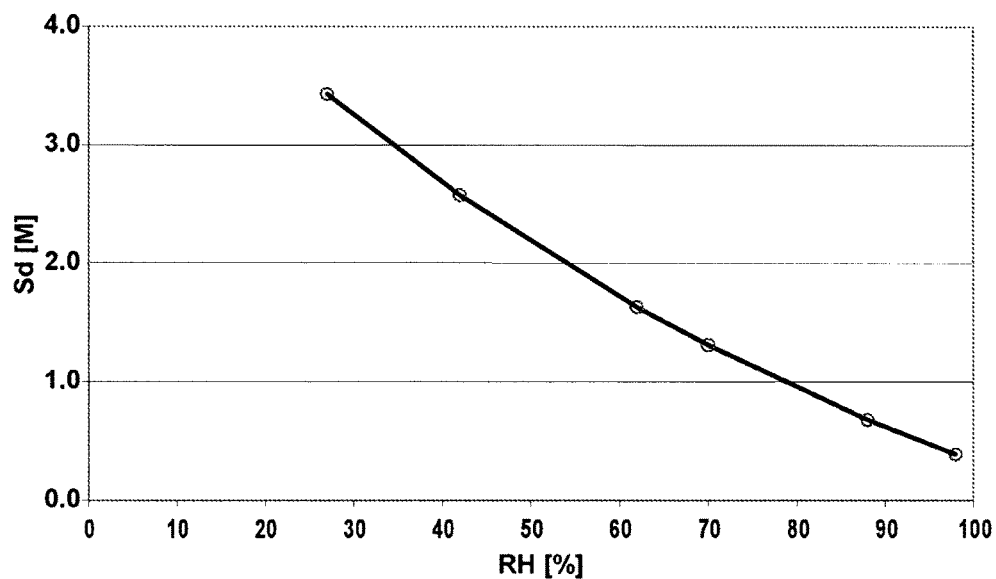
FIGS. 5-6 are graphical plots of the water vapour diffusion resistance (Sd) versus relative humidity (%) for the vapour controls of Comparative Examples A and B, respectively.

From the comparison between comparative experiment A, FIG. 5 and the examples, FIGS. 1-4, it is clear that the water vapour diffusion resistance of the vapour barrier under high relative humidity is higher for the vapour barriers according to the invention. This is important to avoid diffusion from a room with a high RH into the roof construction.

Furthermore it is clear that when the polyamide layer (first layer) is at the side with the highest relative humidity, that the water vapour diffusion resistance is lowest, which means that the water permeability is highest. Therefore it is best to direct the first layer to the side of the roof construction and the second layer at the inside of the building. In summertime, if there is a high relative viscosity in the roof construction, the roof construction will very well be able to dry by transport of the water to inside the building. If however in winter conditions, when the relative humidity is low in the roof construction, but when we want to avoid condensation at cold spots, the vapour barrier will even better prevent water vapour to penetrate from the inside of the building into the roof construction, also at places where a bath-room or a kitchen is present.

The invention claimed is:
1. A vapour barrier for a building comprising a multi-layer water vapour control film comprised of a first layer and a second layer, wherein
the first layer has a water vapour diffusion resistance (Sd-value) of 1-5 meters diffusion-equivalent air space width, measured at a relative humidity of an atmosphere surrounding the first layer of 30-50%, and having a Sd-value of <1 meters diffusion-equivalent air space width, measured at a relative humidity of 60-80%, and wherein
the second layer has a Sd-value of >0.2 meters diffusion-equivalent air space width, measured at a relative humidity of 80-100%, and wherein
the second layer is located at a side of the vapour barrier facing an inside of the building relative to a position of the first layer.

2. The vapour barrier according to claim 1, wherein second layer has a Sd-value of >0.4 meters diffusion-equivalent air space width, measured at a relative humidity of 80-100%.

3. The vapour barrier according to claim 1, wherein the second layer has a Sd-value of >0.8 meters diffusion-equivalent air space width, measured at a relative humidity of 80-100%.

4. The vapour barrier according to claim 1, wherein the second layer has a Sd-value of <3 meters diffusion-equivalent air space width, measured at a relative humidity of 80-100%.

5. The vapour barrier according to claim 1, wherein the first layer comprises a polyamide.

6. The vapour barrier according to claim 1, wherein the second layer comprises a polyester or a copolyester.

7. The vapour barrier according to claim 6, wherein the copolyester of the second layer is a copolyetherester.

8. The water vapour barrier according to claim 1, wherein the second layer comprises a polymer or copolymer selected from the group consisting of polyolefins, vinyl esters, vinyl ethers, acrylates and polyesters.

9. The water vapour barrier according to claim 8, wherein the second layer comprises a polymer or copolymer selected from the group consisting of methacrylates, polyethylene terephthalate, polybutylene terephthalate and thermoplastic elastomers comprising hard segments of polyester.

10. The water vapour barrier according to claim 9, wherein the second layer comprises a polymer or copolymer selected from the group consisting of copolyetheresters, polyurethanes, polyacrylates, polymethacrylates, polyvinylacetates.

11. A vapour barrier for a building comprising a multi-layer water vapour control film comprised of a first layer and a second layer, wherein
the first layer comprises a non-perforated polyamide film having a water vapour diffusion resistance (Sd-value) of 1-5 meters diffusion-equivalent air space width, measured at a relative humidity of an atmosphere surrounding the first layer of 30-50%, and having a Sd-value of <1 meters diffusion-equivalent air space width, measured at a relative humidity of 60-80%, and wherein
the second layer comprises a non-perforated copolyetherester film having a Sd-value of greater than 0.2 meters diffusion-equivalent air space width to less than 2.0 meters diffusion-equivalent air space width, measured at a relative humidity of 80-100%, and wherein
the second layer is located at a side of the vapour barrier facing an inside of the building relative to a position of the first layer.

* * * * *